(12) United States Patent
Ubaldi

(10) Patent No.: US 9,615,513 B2
(45) Date of Patent: Apr. 11, 2017

(54) HARVESTER PICK-UP SUPPORT

(71) Applicant: ROC S.R.L., Poggio Torriana (IT)

(72) Inventor: Raffaele Ubaldi, Santa Giustina di Rimini (IT)

(73) Assignee: ROC S.R.L., Poggio Torriana (IT)

( * ) Notice: Subject to any disclaimer, the term of this patent is extended or adjusted under 35 U.S.C. 154(b) by 39 days.

(21) Appl. No.: 14/706,514

(22) Filed: May 7, 2015

(65) Prior Publication Data
US 2015/0319928 A1 Nov. 12, 2015

(30) Foreign Application Priority Data
May 8, 2014 (IT) .............................. BO2014A0272

(51) Int. Cl.
| | |
|---|---|
| A01D 34/00 | (2006.01) |
| A01D 67/00 | (2006.01) |
| A01D 57/28 | (2006.01) |
| A01D 78/14 | (2006.01) |
| A01D 57/20 | (2006.01) |

(52) U.S. Cl.
CPC ........... *A01D 67/005* (2013.01); *A01D 57/20* (2013.01); *A01D 57/28* (2013.01); *A01D 78/14* (2013.01)

(58) Field of Classification Search
CPC .... A01D 46/081; A01D 84/00; A01D 89/001; A01D 45/00
USPC ......................................................... 56/15.5
See application file for complete search history.

(56) References Cited

U.S. PATENT DOCUMENTS

| | | | | |
|---|---|---|---|---|
| 3,785,130 A | * | 1/1974 | Gaeddert ............. | A01D 45/021 56/15.5 |
| 4,249,365 A | * | 2/1981 | Hubbard ................ | A01D 46/08 56/13.2 |
| 4,344,271 A | * | 8/1982 | Schlueter ............. | A01D 46/081 56/13.6 |
| 4,470,244 A | * | 9/1984 | Leigers .................. | A01D 63/02 56/13.9 |
| 4,803,830 A | * | 2/1989 | Junge ................... | A01D 46/081 56/13.5 |

(Continued)

FOREIGN PATENT DOCUMENTS

| | | |
|---|---|---|
| EP | 0 827 684 A2 | 3/1998 |
| EP | 2 727 454 A1 | 5/2014 |

(Continued)

*Primary Examiner* — Árpád Fábián-Kovács
(74) *Attorney, Agent, or Firm* — Pearne & Gordon LLP

(57) ABSTRACT

A device for harvesting long agricultural products, such as grass, straw, pulses, biomass products, including a first unit (2) and a second unit (3) for picking up the agricultural products extending along a relative main line (A) and equipped with pick-up device (4, 6) configured to pick up from the ground the agricultural products and an unloading device (5, 7) operatively located downstream of the pick-up device (4, 6) and movable along the main line (A) for releasing the agricultural products. The harvesting device also includes a frame (9) having one or more portions (9a) connectable to the front of a self-propelled agricultural unit (100) and provided with a first connecting and supporting member (10) and second connecting and supporting member (11) associated respectively with the first pick-up unit (2) and the second pick-up unit (3) and positioned on opposite sides of the frame (9) relative to a middle line (D) of the frame (9) which is orthogonal to the main line (A).

13 Claims, 3 Drawing Sheets

(56) References Cited

U.S. PATENT DOCUMENTS

| | | | | |
|---|---|---|---|---|
| 4,896,491 A * | 1/1990 | Warnsholz | A01D 46/085 | 56/10.2 R |
| 4,896,492 A * | 1/1990 | Junge | A01D 46/081 | 56/13.5 |
| 4,922,695 A * | 5/1990 | Covington | A01D 46/081 | 56/40 |
| 5,782,072 A * | 7/1998 | Matthews | A01D 41/1278 | 56/10.2 F |
| 5,911,625 A | 6/1999 | Allwörden | | |
| 6,079,192 A * | 6/2000 | Rasmussen | A01D 46/081 | 172/2 |
| 6,212,864 B1 * | 4/2001 | Harden | A01D 46/14 | 56/35 |
| 7,500,341 B2 | 3/2009 | Hironimus et al. | | |
| 7,628,004 B2 * | 12/2009 | Geiser | A01D 84/00 | 56/192 |
| 8,028,506 B1 * | 10/2011 | Casper | A01D 46/081 | 172/5 |
| 8,919,088 B2 * | 12/2014 | Dow | | 56/192 |
| 2003/0074876 A1 * | 4/2003 | Patterson | A01D 41/14 | 56/257 |
| 2004/0200203 A1 * | 10/2004 | Dow | A01B 73/02 | 56/375 |
| 2005/0252183 A1 | 11/2005 | Hironimus et al. | | |
| 2009/0133372 A1 | 5/2009 | Hironimus et al. | | |
| 2009/0241503 A1 * | 10/2009 | Babler | A01D 84/00 | 56/366 |
| 2010/0037584 A1 * | 2/2010 | Dow | A01B 73/02 | 56/376 |
| 2011/0030326 A1 * | 2/2011 | Markt | A01D 41/14 | 56/14.5 |
| 2012/0060458 A1 | 3/2012 | Hironimus et al. | | |
| 2012/0060459 A1 | 3/2012 | Hironimus et al. | | |
| 2012/0247078 A1 * | 10/2012 | Landon | A01D 57/28 | 56/192 |
| 2013/0014481 A1 | 1/2013 | Dow et al. | | |

FOREIGN PATENT DOCUMENTS

| | | |
|---|---|---|
| WO | 03/079761 A1 | 10/2003 |
| WO | 2012/094331 A2 | 7/2012 |

* cited by examiner

HARVESTER PICK-UP SUPPORT

BACKGROUND OF THE INVENTION

This invention relates to a device for harvesting long agricultural products and an agricultural self-propelled unit for harvesting agricultural products comprising the device.

This invention is thus applied in particular in the agricultural sector, in particular in the harvesting of products performed after the cutting (or mowing).

Harvesting devices, otherwise known as windrowers, are normally used for picking up from the ground grass, straw, hay (also cut by other machines) or for picking up pulses, as well as for picking up seed products, and, in any case, for picking up similar agricultural products, with a long shape.

Typically, these devices are equipped with a suitable movement carriage and are connected to a tractor or the like which pulls them, like a trailer, along a direction of forward movement.

These devices are equipped with an arm, generally extending in a curved fashion from the rear portion to the front portion, to allow the connection with the rear hook of the tractor keeping the device oriented correctly, that is to say, with the pick-up means facing the tractor.

Only in some cases, for the small-sized devices (that is, equipped with a single pick-up unit), there is the possibility of connecting them to the front portion of the tractor, which, however, must be set up for this application, with considerable costs to be borne by the user.

Moreover, it should be noted that this optional feature not may be acceptable for larger devices (that is, equipped with several pick-up units) since the visibility and driving problems would make it difficult to use the device.

In any case, from the above description it is evident that the prior art windrowers need a tractor for moving them, which represents a considerable cost for the user, especially if it is necessary to purchase a new pulling vehicle.

SUMMARY OF THE INVENTION

The aim of this invention is therefore to provide a device for harvesting long agricultural products and a self-propelled unit for harvesting agricultural products which overcome the above-mentioned drawbacks of the prior art.

More specifically, the aim of this invention is to provide a device for harvesting long agricultural products which can be easily installed in existing self-propelled units, thus reducing the investment by the user.

Moreover, the aim of this invention is to provide a self-propelled unit for harvesting agricultural products which is able to allow a high visibility and flexibility for the operator unloading the products.

These aims are achieved by a device for harvesting long agricultural products according to one or more of the subsequent claims 1 to 11, as well as self-propelled unit for harvesting the agricultural products according to claims 12 and 13.

More specifically, the harvesting device according to this invention comprises a first unit for picking up the agricultural products extending along a relative main line which, during use, remains transversal to a direction of forward movement, provided with first pick-up means configured for picking up from the ground the agricultural products and first unloading means operatively located downstream of the first pick-up means and movable along the main line for releasing the agricultural products, a second unit for picking up the agricultural products extending along a relative main line which, during use, remains transversal to a direction of forward movement and provided with second pick-up means configured for picking up from the ground the agricultural products and second unloading means operatively located downstream of the second pick-up means and movable along the direction for releasing the agricultural products.

According to the invention, the device is equipped with a frame comprising one or more portions connectable to the front of a self-propelled agricultural unit and provided with first connecting and supporting means and second connecting and supporting means associated respectively with the first pick-up unit and the second pick-up unit and positioned on opposite sides of the frame relative to a middle line of the frame which is orthogonal to the main line.

Advantageously, in this way the harvesting device can be positioned in front of a self-propelled agricultural unit, which is designed for supporting a front operating machine (for example, a mowing machine), thus allowing the operator to be provided, with maximum simplicity and low costs, with a machine for harvesting agricultural products which is self-propelled and easily usable thanks to the maximum visibility guaranteed by the front connection.

It should be noted that the device is free of transportation wheels, that is, wheels used during transport of the device by road.

It is equipped solely, in the preferred embodiments, with spacer wheels, positioned below the unloading means for providing a support and maintaining a predetermined distance between the ground and the pick-up means.

Preferably, the first and second connecting and supporting means are movable towards and away from one another along the main line for moving the first pick-up unit and the second pick-up unit between at least one near position and at least one far position.

More specifically, in the close-together position the two pick-up units are substantially adjacent. In other words, in this position the inner ends of the two pick-up units are abutted against each other.

In the spaced-apart position, on the other hand, the two pick-up units are spaced from each other in such a way as to form a space for unloading the products interposed with each other.

Advantageously, in that way the operator has maximum freedom and flexibility in distributing the products picked up in rows arranged in the most suitable way according to the use.

More specifically, when the first unit and the second unit are in the close-together position, the products can be unloaded from one or both the outer ends of them.

When the first unit and the second unit are in the spaced-apart position, the products can, on the other hand, be unloaded both from the inner ends and from the outer ends.

This invention also relates to a self-propelled agricultural unit for harvesting agricultural products, comprising a supporting structure, a driver's cab rising from a front portion of the supporting structure, a first pair of wheels, for driving, pivoted to the frame at the front portion, a second pair of wheels, for steering, pivoted to the frame at a rear portion, opposite the front portion, and an operating machine connected to the front portion of the supporting structure.

According to the invention, the operating machine comprises a device for harvesting agricultural products as described above, wherein the frame is connected to the front portion of the supporting structure.

Preferably, there is an actuator unit associated with the front portion of the supporting structure and operatively interposed between the front portion and the frame of the harvesting device for moving it between a raised, home position, and a lowered, operating position.

Advantageously, it should be noted that this structure allows the pick-up device to be applied to an existing self-propelled unit, for example of the type equipped with mowers, which once the cutters applied to them are to be scrapped can be recycled for a windrowing/raking application.

In that way, the investment necessary by the operator for purchasing a self-propelled unit which is able to transport the windrower (or harvesting device) is opportunely reduced, with the further advantage of maximising the efficiency.

In effect, in this way it is possible for the owner to "recycle" a used pulling vehicle intended to be scrapped, as it no longer performs for mowing, for a further application.

BRIEF DESCRIPTION OF DRAWINGS

These and other features are more apparent from the detailed description, set out below, of a preferred non-limiting example embodiment of a device for harvesting long agricultural products and a self-propelled unit for harvesting agricultural products as illustrated in the accompanying drawings, in which.

DESCRIPTION OF PREFERRED EMBODIMENTS

Figure 1:
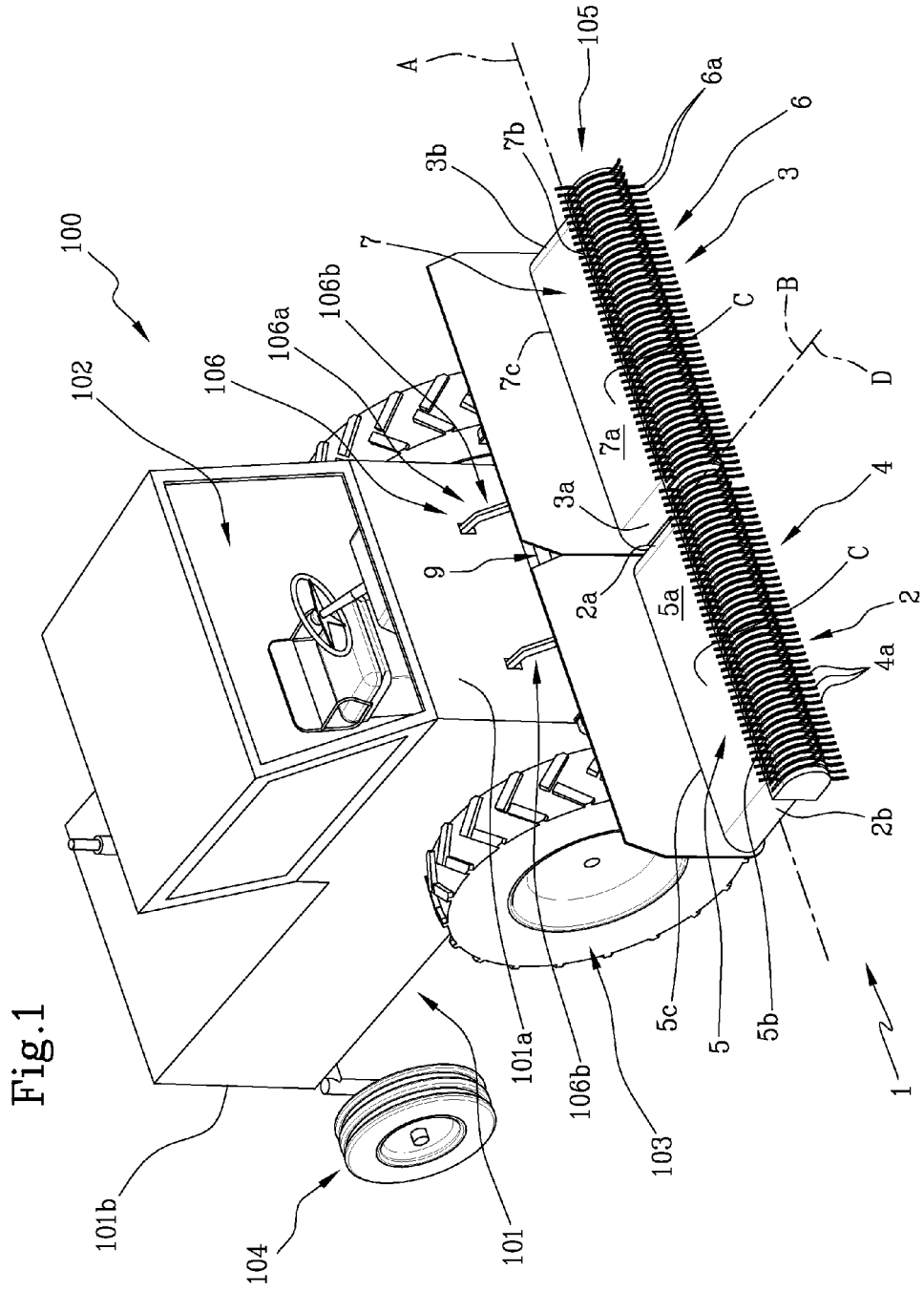
FIG. 1 is a schematic perspective view of a self-propelled agricultural unit according to this invention.
Figure 2:
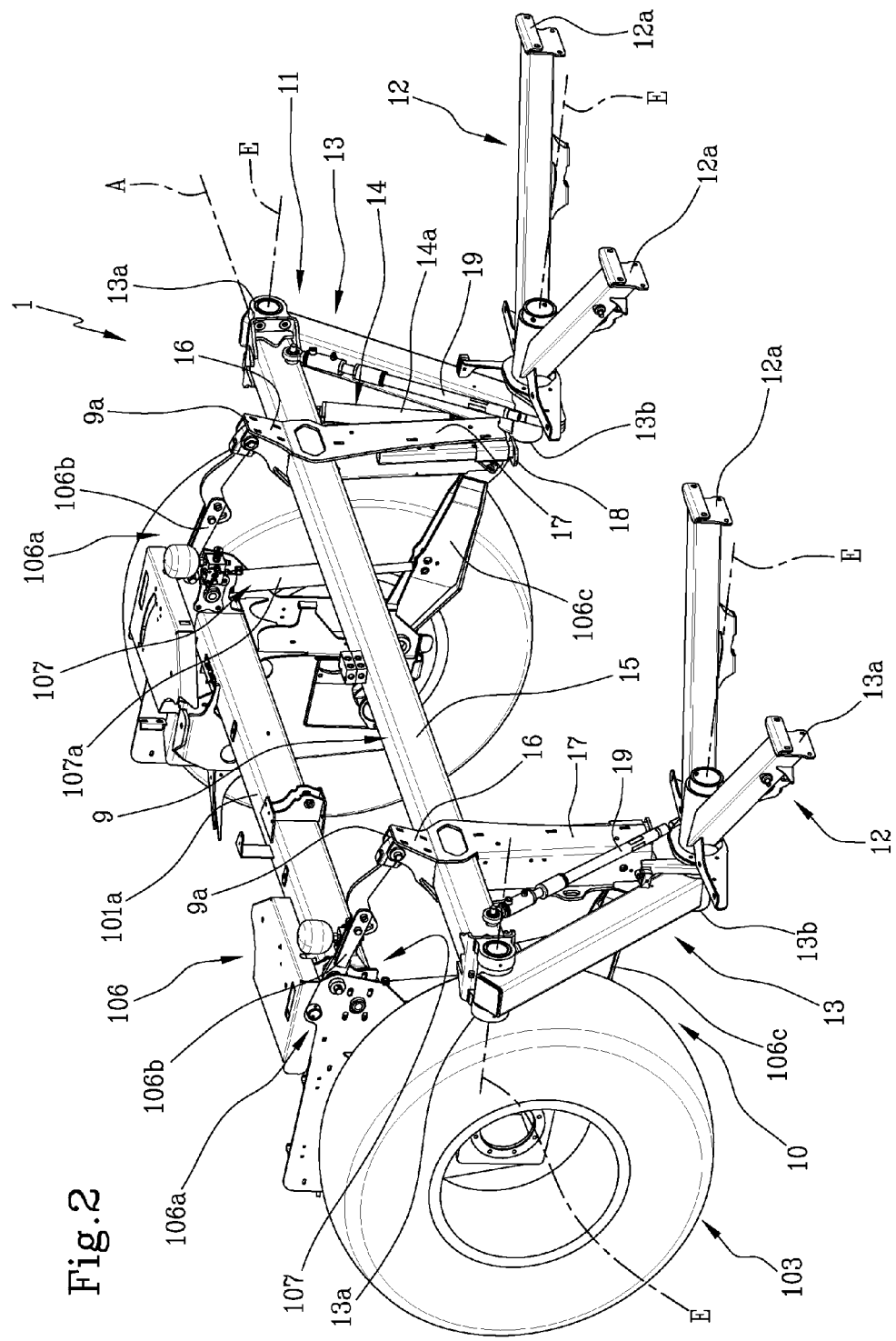
FIG. 2 is a schematic perspective view of a detail of a device for harvesting agricultural products according to this invention mounted on the unit of FIG. 1.
Figure 3A:
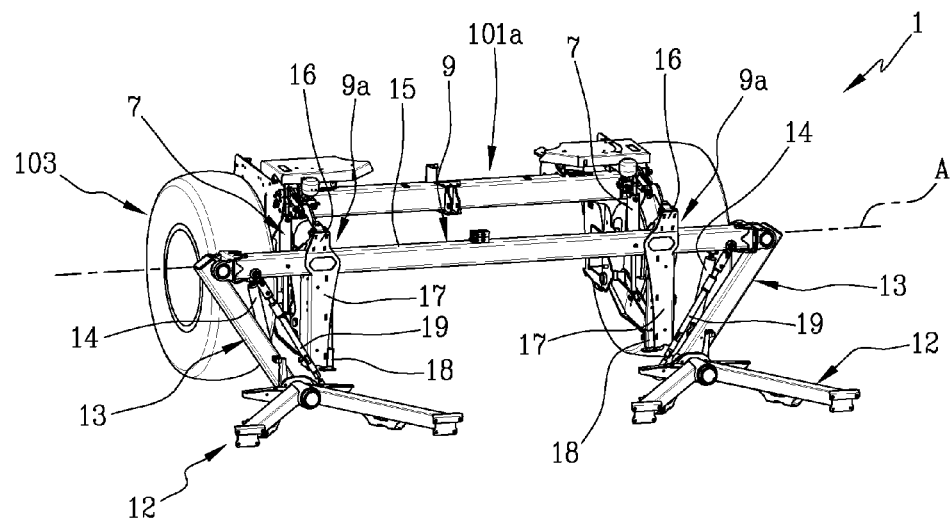
FIGS. 3a and 3b show two schematic views of the device of FIG. 2 in two different operating configurations.
Figure 3B:
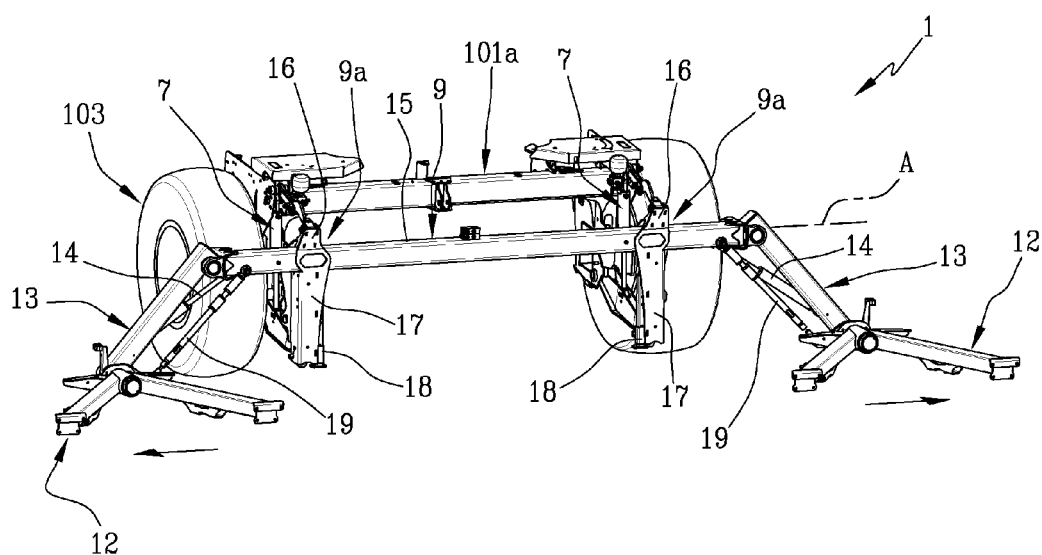

With reference to the accompanying drawings, the numeral 1 denotes a device for harvesting long agricultural products according to this invention.

More specifically, the device 1 is configured for picking up products from the ground such as grass, straw, hay (also cut by other machines) or for picking up pulses and, in any case, for picking up similar agricultural products (usually plants), with a long shape.

The device 1 is of the type which can be pulled by a pulling vehicle. According to one aspect of the invention, the device 1 is set up to be connected to a self-propelled unit 100, of the type traditionally used in the agricultural sector.

The self-propelled unit 100 comprises a supporting structure 101 extending between a front portion 101a and a rear portion 101b, opposite the front portion 101a, both defined with reference to a predetermined direction of forward movement "B".

A driver's cab 102 of the self-propelled unit 100 preferably rises from this front portion 101a.

Inside the driver's cab 102 there is at least a seat, a steering wheel and a system for controlling the devices associated with the self-propelled unit 100.

As illustrated, the self-propelled unit 100 comprises a first pair of drive wheels 103, pivoted on the supporting structure 101 at the front portion 101a and at least one wheel 104 (or pair of wheels), which is freely rotating or for steering, pivoted on the supporting structure 101 at of the rear portion 101b.

The first pair of wheels 103 is connected to a motor (not illustrated) of the self-propelled unit.

In a first embodiment, the first pair of wheels 103 is operatively connected to the drive means which vary the speed to allow the rotation of the vehicle.

In this embodiment, the second wheel 104, or second pair of wheels, is freely rotatable relative to the supporting structure 101.

Alternatively, the second wheel 104 (or second pair) could be operatively connected to the steering wheel located in the driver's cab 102.

In a further embodiment, the first pair of wheels 103 and/or the second wheel 104 (or pair of wheels) could be associated with a remote self-drive system.

Preferably, the wheels of the first pair 103 have a diameter greater than those of the second pair 104.

An operating machine 105 designed to perform a agricultural process is connected to the front portion 101a.

In this regard, the supporting structure 101 comprises, at the front portion 101a, a supporting unit 106 projecting in front of it and set up for removably connecting the machine 105.

Preferably, the supporting unit 106 comprises two forks 106a projecting forwardly from the supporting structure 101 and positioned side by side.

Each fork is equipped with a first, upper, arm 106b and a second, lower, arm 106c.

More preferably, the second arms 106c are movable up and down towards and away from the first arms 106b to allow a lifting and lowering of the operating machine 105 between a lowered operating position and a raised home position.

Alternatively, the supporting unit 106 might be provided with a single first, upper, arm 106c, positioned centrally.

In the embodiment illustrated, the self-propelled unit 100 comprises an actuating unit 107, associated with the front portion 101a of the supporting structure 101 and operatively interposed between the front portion 101a and a frame of the operating machine 105 for moving it between the home and operating positions.

More in detail, the actuating unit 107 comprises at least a hydraulic cylinder 107a (preferably a pair of hydraulic cylinders) operatively interposed between the supporting structure 101 and the second arms 106b of the forks 106a.

It should be noted that the operating machine 105 is defined by a device 1 for picking up agricultural products according to this invention.

The device 1 is thus mountable and removable from the self-propelled unit 100, being designed both for an application on new units and for an adaptation to existing self-propelled units.

The device 1 preferably comprises a first unit 2 and a second unit 3 for picking up agricultural products configured for picking up from the ground the agricultural products already cut.

Each pick-up unit 2, 3 comprises in this regard means for picking up and means for unloading products.

More specifically, the first pick-up unit 2 extends along its own main line "A" which, during use, remains transversal to the line of travel "B" and is provided with first pick-up means 4.

Further, the first pick-up unit 2 comprises corresponding first unloading means 5 operatively located downstream of the first pick-up means 4 and movable along the main line "A" for releasing the agricultural products.

Similarly, the second pick-up unit 3 extends along its own main line "A" which, during use, remains transversal to the line of travel "B" and is provided with second pick-up means 6.

Further, the second pick-up unit 3 comprises corresponding second unloading means 7 operatively located downstream of the second pick-up means 5 and movable along the main line "A" for releasing the agricultural products.

The first pick-up unit 2 and the second pick-up unit 3 are aligned with each other along a same main line "A," defining the direction of extension of the device 1.

More specifically, the first pick-up unit 2 and the second pick-up unit 3 both extend along the main line "A" between an inner end 2a, 3a and an outer end 2b, 3b.

The two inner ends 2a, 3a of the pick-up units 2, 3 face and are proximal to each other, whilst the two outer ends 2b, 3b are distal from each other.

Preferably, the first pick-up means 4 and the second pick-up means 6 comprise a plurality of rotary elements 4a, 6a, each in turn equipped with at least one long harvesting tine, which are positioned and spaced one after another along the main line "A".

The tines are preferably arranged around the same central axis of rotation, oriented radially thereto in spoke-like fashion.

In this regard, each pick-up unit 2, 3 comprises a movement system for moving each of the rotatable elements 4a, 6a along a closed path surrounding the main axis of extension "A" (corresponding to the aforementioned central axis). In effect, the product harvesting axis is transversal, preferably at right angles, to the axis of extension "A".

The closed path comprises a transporting stretch along which the agricultural product is transported between a pickup point where the product is lifted from the ground by the long tines and a release point where the agricultural product is disengaged from the tines, facing the respective pins 5 or second unloading means 7.

Preferably, the first unloading means 5 and the second unloading means 7 both comprise a conveyor belt 5a, 7a, extending along the main line "A" between a first end and a second end along a first longitudinal edge 5b, 7b, adjacent to the respective pick-up means 4, 6 and a second longitudinal edge 5c, 7c, opposite to the first edge 5b, 7b.

The conveyor belts 5a, 7a of the unloading means between the two ends.

The first longitudinal edge 5b, 7b of the first unloading means 5 and second unloading means 7 faces the release point of the respective first pick-up means 4 or second pick-up means 6.

It should be noted that the first ends of the conveyor belt 5a, 7a of the first unloading means 5 and second unloading means 7 define the inner ends 2a, 3a of the first pick-up unit 2 and second pick-up unit 3.

Similarly, the second ends of the conveyor belt 5a, 7a of the first unloading means 5 and second unloading means 7 define the outer ends 2b, 3b of the first pick-up unit 2 and second pick-up unit 3.

According to one aspect of the invention, the device 1 comprises a frame 9 having one or more portions 9a connectable to the front of the self-propelled unit 100.

Moreover, the frame 9 is equipped with first connecting and supporting means 10 and second connecting and supporting means 11 associated, respectively, with the first pick-up unit 2 and the second pick-up 3.

The first connecting and supporting means 10 and second connecting and supporting means 11 are in effect positioned on opposite sides of the frame 9 relative to a middle line "D" of the frame 9 at right angles to the main line "A."

Advantageously, in this way it is possible to install in a simple fashion a harvesting device 1 (or windrowing device) on an existing self-propelled unit, previously equipped with another operating machine, such as for example a mower.

Preferably, the first 10 and second means connecting and supporting means 11 are movable towards and away from each other along the main line "A" for move the first 2 and the second element 3 between at least one near position and at least one far position.

Advantageously, as mentioned above, in that way the operator has maximum freedom and flexibility in distributing the products picked up in rows arranged in the most suitable way according to the use.

In effect, in the close-together position the two pick-up units 2, 3 are substantially adjacent. In other words, in this position the inner ends 2a, 3a of the two pick-up units 2, 3 are abutted against each other.

In the spaced-apart position, on the other hand, the two pick-up units 2, 3 are spaced from each other in such a way as to form a space "S" for unloading the agricultural products interposed with each other.

More specifically, when the first pick-up unit 2 and the second pick-up unit 3 are in the close-together position, the products can be unloaded from one or both the outer ends 2b, 3b of them.

When the first pick-up unit 2 and the second pick-up unit 3 are, however, in the spaced-apart position, the products can be unloaded both from the inner ends 2a, 3a and from the outer ends 2b, 3b, independently.

Advantageously, in this way it is possible maximise the operating flexibility of the device, allowing the operator to discharge the windrow in a multiplicity of different positions.

The unloading position is a function of the direction of movement of the first unloading means 5 and second unloading means 7, imparted by the operator through the control system (preferably located in the cab 102).

More specifically, the first connecting and supporting means 10 and the second connecting and supporting means 11 each comprise at least a supporting element 12 rigidly connected respectively to the first pick-up unit 2 or second pick-up unit 3. The frame 9 is associated with two supporting elements 12.

Each supporting element 12 is preferably located under the respective pick-up unit 2, 3 to define a support surface.

More specifically, each supporting element 12 defines a frame of the respective pick-up unit 2, 3.

In detail, the pick-up means 4, 6 are preferably anchored to the supporting element 12.

In the preferred embodiment, the supporting element 12 is formed by a pair of bars 12a extending away from each other for forming the support surface.

Alternatively, the supporting element 12 might have a different structure, provided it can be rigidly engaged with the respective pick-p unit 2, 3 and shaped to support it.

To allow the movement of the pick-up units 2, 3, the first connecting and supporting means 10 and the second means connecting and supporting means 11 each comprise an oscillating arm 13 extending between a first end 13a, pivoting at the frame 9, and a second end 13b, pivoting at the respective supporting element 12. In other words, the frame 9 is associated with at least two arms 13.

For this reason, the arms 13 behave substantially as cranks having centre of rotation in the frame 9.

Thus, the oscillation of the arm 13 allows the supporting element 12 (and the respective pick-up 2, 3) to translate along the main line "A".

In this regard, there are constraint means (not illustrated) designed to keep fixed the orientation of the supporting element 12, and hence the respective pick-up unit 2, 3.

The constraint means are operatively interposed between each pick-up unit (first 2 and second 3) and the frame 9 so as to prevent a relative rotation between them.

Advantageously, in this way, the first pick-up unit 2 and the second pick-up unit 3 remain, in use, in a horizontal plane.

More specifically, in this way, the first pick-up unit 2 and the second pick-up unit 3 remain in a plane parallel to the frame 9.

Preferably, in use, the first end 13a of each arm 13 is positioned higher than its second end 13b.

More specifically, the first end 13a and the second end 13b of each arm 13 are connected respectively to the frame 9 and to the supporting element 12 by means of pins defining axes of rotation "E" which are orthogonal to the main line "A".

Preferably, the axes of rotation "E" are substantially horizontal.

Consequently, the arms 13 are rotatable, relative to the frame 9, in a substantially vertical plane of rotation.

To allow the rotation of the arms 13, and thus the reciprocal movement of the first pick-up unit 2 and the second pick-up unit 3, the device 1 comprises actuators means 14 operatively interposed between the frame 9 and the pick-up units 2, 3 and configured for moving them towards and away from one another.

More specifically, the actuator means 14 comprise a first actuator 14a operatively interposed between the frame 9 and the first pick-up unit 2, and a second actuator 14b operatively interposed between the frame 9 and the second pick-up unit 3.

Advantageously, in that way the two units 2, 3 are movable independently of each other allowing the operator to maximise the versatility of the device 1.

Preferably, the first actuator 14a and the second actuator 14b are defined by cylinders, even more preferably of the hydraulic type.

In the embodiment illustrated, each cylinder comprises a rod pivoted to the frame 9 and, a jacket wherein the stem, pivoted to the arm 13 (or vice versa), is slidable.

Preferably, there is also a lever 19 operatively interposed between the frame 9 and the supporting element 12 to maintain the orientation.

Preferably, the lever 19 is pivoted to the frame 9 and to the supporting element 12 at hinge points 1 which are eccentric relative to the axes of rotation "E" (that is, to the pins).

Consequently, the lever 19, together with the arm 13 and the portions of frame and the supporting element interposed between the pin and the hinge point define a four-bar linkage which keeps the pick-up unit horizontal.

Thus, there are two levers 19, each operatively interposed between the frame 9 and a respective supporting element 12 and together with them forming a four-bar linkage for maintaining the orientation of the pick-up unit 2, 3 associated with them.

Preferably, these levers 19 are provided with drive means (preferably one or more cylinders) which allow a predetermined oscillation of the supporting element 12 about the axis "E" (and hence of the pick-up unit relative to the horizontal).

In other words, preferably the levers 19 are partly extendable and retractable to vary the inclination of the pick-up unit 2, 3 associated with them.

These levers 19 define dampers for allowing an oscillation of the pick-up units 2, 3 and therefore their adaptation to the ground.

Structurally, the frame 9 is preferably at least partly defined by a beam 15 extending along the main line "A" between a first end portion 15a and a second end portion 15b.

Preferably, the arms 13 are pivoted to the end portions 15a, 15b of the beam 15.

The beam 15 is provided with at least one connecting recess 16 which can be coupled with at least a first, upper, arm 106c of the forks 106a of the supporting unit 106.

In the embodiment illustrated, there are two seats 16, each coupled to a respective first arm 106c.

Moreover, the frame 9 is equipped with a pair of rods 17 rigidly connected to the beam 15 and protruding from it at right angles.

Preferably, the rods 17 extend, in use, along a substantially vertical direction.

In use, the free ends 17a of the rods 17 are located at a height lower than the beam 15.

Preferably, the second, lower, arms 106c of the forks 106a of the supporting unit 106 are connected, preferably pivoted, to the rods 17.

It should be noted that the rods 17 and the seats 16 define at least partly the connectable portions 9a of the frame 9.

In the embodiment illustrated, the rods 17 have an extractable telescopic portion 18 configured to allow a stable positioning resting on the ground when the device 1 is removed from self-propelled unit 100.

Preferably, also, it should be noted that the device 1 is free of transportation wheels, that is, wheels used during transport of the device by road.

It is equipped solely, in the preferred embodiments, with spacer wheels 18, positioned below the unloading means 5, 7 of the pick-up units 2, 3 for providing a support and maintaining a predetermined distance between the ground and the pick-up means 4, 6.

The invention achieves the preset aims and brings major advantages.

In effect, preparing the frame to allow the connection of the device to a self-propelled unit allows its functionality to be maximised, positioning it in front of the traction means, reducing also the economic impact for the owner.

Moreover, the presence of two pick-up units movable towards and away from one another allows the versatility of the device to be increased, allowing maximum flexibility in unloading operations for the user.

Again, the presence of a frame with two rotary arms in the form of a crank makes the shape of the device very simple and inexpensive to make.

What is claimed is:

1. A device for harvesting long agricultural products, grass, straw, leguminous plants, biomass products, comprising:
    a first pick-up unit (2) for harvesting said agricultural products extending along its own main line (A) which, during use, remains transversal to a line of travel (B), provided with
        first pick-up means (4) designed to pick up from the ground said agricultural products and comprising a plurality of rotary elements (4a) positioned and spaced one after another along the main line (A) which are each in turn equipped with at least one long harvesting tine movable along a closed trajectory around said main line (A), and first unloading means (5) operatively located downstream of the first pick-up means (4) and movable along said main line (A) for releasing the agricultural products;

a second pick-up unit (3) for harvesting said agricultural products extending along its own main line (A) which, during use, remains transversal to a line of travel (B), provided with second pick-up means (6) designed to pick up from the ground said agricultural products and comprising a plurality of rotary elements (6a) positioned and spaced one after another along the main line (A) which are each in turn equipped with at least one long harvesting tine movable along a closed trajectory around said main line (A), and second unloading means (7) operatively located downstream of the second pick-up means (6) and movable along said line (A) for releasing the agricultural products;

a frame (9) comprising one or more portions (9a) connectable to the front of a self-propelled agricultural unit (100) and provided with first connecting and supporting means (10) and second connecting and supporting means (11) associated respectively with said first pick-up unit (2) and said second pick-up unit (3) and positioned on opposite sides of the frame (9) relative to a middle line (D) of said frame (9) which is orthogonal to said main line (A), wherein said first connecting and supporting means (10) and second connecting and supporting means (11) are movable towards and away from one another by a rigid translation along said main line (A) for moving said first pick-up unit (2) and said second pick-up unit (3) between at least one close-together operating position, wherein the two pick-up units are aligned and substantially adjacent and the picked-up products can be unloaded from one or both the outer ends of them, and at least one spaced apart operating position, wherein the two pick-up units are aligned and spaced from each other in such a way as to form a space for unloading the picked-up products interposed with each other and wherein the direction of movement of the first unloading means and second unloading means can be imparted independently one another through a control system.

2. The device according to claim 1, characterised in that the first connecting and supporting means (10) and the second connecting and supporting means (11) each comprise:

at least a supporting element (12) rigidly connected respectively to the first pick-up unit (2) or to the second pick-up unit (3), and an oscillating arm (13) extending between a first end (13a), pivoting at the frame (9), and a second end (13b), pivoting at the respective supporting element (12).

3. The device according to claim 2, characterised in that, in use, said first end (13a) of each arm (13) is positioned at a height higher than the respective second end (13b).

4. The device according to claim 2, characterised in that said first end (13a) and said second end (13b) of each arm (13) are connected respectively to the frame (9) and to the supporting element (12) by means of pins defining axes of rotation (E) which are orthogonal to said main line (A).

5. The device according to claim 2, characterised in that it comprises two levers (19), each operatively interposed between the frame (9) and a respective supporting element (12) and together with them forming a four-bar linkage for maintaining the orientation of the pick-up unit (2, 3) associated with them.

6. The device according to claim 5, characterised in that the levers (19) are partly extendable and retractable for allowing an oscillation of the pick-up unit (2, 3) associated with them about its own axis of rotation (E).

7. The device according to claim 1, characterised in that it comprises actuator means (14) operatively interposed between said frame (9) and said first pick-up unit (2) and second pick-up unit (3) and designed to move them towards and away from one another.

8. The device according to claim 7, characterised in that said actuator means (14) comprise at least a first actuator (14a) operatively interposed between the frame (9) and the first pick-up unit (2), and a second actuator (14b) operatively interposed between the frame (9) and the second pick-up unit (3).

9. The device according to claim 1, characterised in that the first unloading means (5) and the second unloading means (7) each comprise a conveyor belt (5a, 7a) extending along said main line (A) between a first end and a second end along a first longitudinal edge (5b, 7b), adjacent to the respective pick-up means (4, 6) and a second longitudinal edge (5c, 7c), opposite to the first edge (5b, 7b), where the conveyor belt (5a, 7a) forms a supporting surface (C) movable along the main line (A).

10. A self-propelled agricultural unit for harvesting agricultural products, comprising:

a supporting structure (101) extending between a front portion (101a) and a rear portion (101b), opposite to the front portion (101a);

a first pair of wheels (103), which are driving wheels, pivoting at the frame (101) at said front portion (101a);

a second pair of wheels (104), for steering, pivoting at the frame (101) at said rear portion (101b);

an operating machine (105) connected to said front portion (101a) of the supporting structure (101);

characterised in that said operating machine (105) comprises a device (1) for harvesting agricultural products according to claim 1, where said frame (9) is connected to the front portion (101a) of the supporting structure (101).

11. The self-propelled agricultural unit according to claim 10, characterised in that it comprises an actuator unit (107) associated with said front portion (101a) of the supporting structure (101) and operatively interposed between said front portion (101a) and the frame (9) of the harvesting device (1) for moving it between a raised, home position, and a lowered, operating position.

12. A device for harvesting long agricultural products, grass, straw, leguminous plants, biomass products, comprising:

a first pick-up unit (2) for harvesting said agricultural products extending along its own main line (A) which, during use, remains transversal to a line of travel (B), provided with first pick-up means (4) designed to pick up from the ground said agricultural products and comprising a plurality of rotary elements (4a) positioned and spaced one after another along the main line (A) which are each in turn equipped with at least one long harvesting tine movable along a closed trajectory around said main line (A), and first unloading means (5) operatively located downstream of the first pick-up means (4) and movable along said main line (A) for releasing the agricultural products;

a second pick-up unit (3) for harvesting said agricultural products extending along its own main line (A) which, during use, remains transversal to a line of travel (B), provided with second pick-up means (6) designed to pick up from the ground said agricultural products and comprising a plurality of rotary elements (6*a*) positioned and spaced one after another along the main line (A) which are each in turn equipped with at least one long harvesting tine movable along a closed trajectory around said main line (A), and second unloading means (7) operatively located downstream of the second pick-up means (6) and movable along said line (A) for releasing the agricultural products;

a frame (9) comprising one or more portions (9*a*) connectable to the front of a self-propelled agricultural unit (100) and provided with first connecting and supporting means (10) and second connecting and supporting means (11) associated respectively with said first pick-up unit (2) and said second pick-up unit (3) and positioned on opposite sides of the frame (9) relative to a middle line (D) of said frame (9) which is orthogonal to said main line (A), wherein said first connecting and supporting means (10) and second connecting and supporting means (11) are movable towards and away from one another by a rigid translation along said main line (A) for moving said first pick-up unit (2) and said second pick-up unit (3) between at least one close-together operating position, wherein the two pick-up units are aligned and substantially adjacent and the picked-up products can be unloaded from one or both the outer ends of them, and at least one spaced apart operating position, wherein the two pick-up units are aligned and spaced from each other in such a way as to form a space for unloading the picked-up products interposed with each other;

and wherein it comprises a control system configured to impart the direction of movement of the first unloading means and second unloading means independently one another.

13. A device for harvesting long agricultural products, grass, straw, leguminous plants, biomass products, comprising:

a first pick-up unit (2) for harvesting said agricultural products extending along its own main line (A) which, during use, remains transversal to a line of travel (B), provided with first pick-up means (4) designed to pick up from the ground said agricultural products and comprising a plurality of rotary elements (4*a*) positioned and spaced one after another along the main line (A) which are each in turn equipped with at least one long harvesting tine movable along a closed trajectory around said main line (A), and first unloading means (5) operatively located downstream of the first pick-up means (4) and movable along said main line (A) for releasing the agricultural products;

a second pick-up unit (3) for harvesting said agricultural products extending along its own main line (A) which, during use, remains transversal to a line of travel (B), provided with second pick-up means (6) designed to pick up from the ground said agricultural products and comprising a plurality of rotary elements (6*a*) positioned and spaced one after another along the main line (A) which are each in turn equipped with at least one long harvesting tine movable along a closed trajectory around said main line (A), and second unloading means (7) operatively located downstream of the second pick-up means (6) and movable along said line (A) for releasing the agricultural products;

a frame (9) comprising one or more portions (9*a*) connectable to the front of a self-propelled agricultural unit (100) and provided with first connecting and supporting means (10) and second connecting and supporting means (11) associated respectively with said first pick-up unit (2) and said second pick-up unit (3) and positioned on opposite sides of the frame (9) relative to a middle line (D) of said frame (9) which is orthogonal to said main line (A), wherein said first connecting and supporting means (10) and second connecting and supporting means (11) are movable towards and away from one another by a rigid translation along said main line (A) for moving said first pick-up unit (2) and said second pick-up unit (3) between at least one close-together operating position, wherein the two pick-up units are aligned and substantially adjacent and the picked-up products can be unloaded from one or both the outer ends of them, and at least one spaced apart operating position, wherein the two pick-up units are aligned and spaced from each other in such a way as to form a space for unloading the picked-up products interposed with each other, and wherein the first connecting and supporting means (10) and the second connecting and supporting means (11) each comprise:

at least a supporting element (12) rigidly connected respectively to the first pick-up unit (2) or to the second pick-up unit (3), and an oscillating arm (13) extending between a first end (13*a*), pivoting at the frame (9), and a second end (13*b*), pivoting at the respective supporting element (12);

constraint means designed to keep fixed the orientation of the supporting element (12).

\* \* \* \* \*